United States Patent
Di Franco

(10) Patent No.: US 8,413,937 B2
(45) Date of Patent: Apr. 9, 2013

(54) SIDE SKIRT MOUNTING ASSEMBLY FOR CONTAINER CHASSIS

(75) Inventor: Benito Di Franco, Mississauga (CA)

(73) Assignee: Innovative Trailer Design Technologies, Inc., Mississauga, Ontario (CA)

( * ) Notice: Subject to any disclaimer, the term of this patent is extended or adjusted under 35 U.S.C. 154(b) by 271 days.

(21) Appl. No.: 12/835,219

(22) Filed: Jul. 13, 2010

(65) Prior Publication Data

US 2011/0253851 A1    Oct. 20, 2011

Related U.S. Application Data

(60) Provisional application No. 61/324,059, filed on Apr. 14, 2010.

(51) Int. Cl.
   *F16M 11/00* (2006.01)
(52) U.S. Cl.
   USPC ........... 248/201; 293/21; 296/180.4; 296/206
(58) Field of Classification Search .................. 248/592, 248/201, 900; 293/21; 296/180.1, 180.3, 296/180.4, 180.5, 206
   See application file for complete search history.

(56) References Cited

U.S. PATENT DOCUMENTS

| | | | |
|---|---|---|---|
| 3,401,953 A * | 9/1968 | Prohl et al. .................... | 280/851 |
| 5,280,990 A * | 1/1994 | Rinard ........................ | 296/180.1 |
| 5,921,617 A * | 7/1999 | Loewen et al. ............ | 296/180.4 |
| 6,799,791 B2 | 10/2004 | Reiman et al. | |
| 7,086,674 B2 * | 8/2006 | Goertz ......................... | 293/132 |
| 7,093,889 B2 * | 8/2006 | Graham ....................... | 296/180.4 |
| 7,404,592 B2 | 7/2008 | Reiman et al. | |
| 7,604,284 B2 | 10/2009 | Reiman et al. | |
| 8,162,384 B2 * | 4/2012 | Giromini et al. ........... | 296/180.4 |
| 8,177,286 B2 * | 5/2012 | Brown et al. .............. | 296/180.4 |
| 8,186,745 B2 * | 5/2012 | Graham et al. ............ | 296/180.1 |
| 2009/0189414 A1 * | 7/2009 | Boivin et al. .............. | 296/180.4 |
| 2012/0074728 A1 * | 3/2012 | Senatro ...................... | 296/180.4 |
| 2012/0169086 A1 * | 7/2012 | Giromini et al. ........... | 296/181.5 |

OTHER PUBLICATIONS

Definition of "Container Chassis" on Web, Google Search results, accessed Apr. 12, 2010, http:www.google.ca, p. 1.
Containerization, Wikipedia article, accessed Apr. 12, 2010, http://wikipedia.org/wiki/Containerization, pp. 1-3.
Laydon Composite, Ltd. Trailer Fairings, Web page, accessed Apr. 12, 2010. http://www.laydoncomp.com/trailer-skirts.php, p. 1.

* cited by examiner

*Primary Examiner* — Bradley Duckworth
(74) *Attorney, Agent, or Firm* — Sullivan & Worcester LLP; Christopher T. McWhinney

(57) ABSTRACT

A mounting assembly for securing a bracket, to which a side skirt may be attached to a frame of a wheeled container chassis semi-trailer. The assembly includes a support and at least one resilient securement member. A proximal end of the support may be mounted in a substantially outwardly transverse horizontal orientation to one side of the semi-trailer; a distal end secures the bracket in a position to maintain the side skirt in a substantially vertical configuration between the frame and a ground surface on which the semi-trailer is situated and substantially in line with the wheels on the one side of the semi-trailer. The securement members mount the support to the frame. The support may move relative to the frame in response to an applied force and is biased to return and maintain the support in the substantially outwardly transverse horizontal orientation when the force is removed.

15 Claims, 5 Drawing Sheets

SIDE SKIRT MOUNTING ASSEMBLY FOR CONTAINER CHASSIS

RELATED APPLICATIONS

The present disclosure claims priority from U.S. Provisional Patent Application No. 61/324,059 filed Apr. 14, 2010, which is incorporated in its entirety herein.

TECHNICAL FIELD

The present disclosure relates to container shipping and more particularly, to an assembly for affixing a side skirt to a wheeled container chassis.

INTRODUCTION

Modern intermodal freight transport makes use of standard intermodal containers having certain standard dimensions (typically 8 feet wide and having one of five standard lengths, namely 20, 40, 45, 47 and 53 feet; container heights are typically 8 feet but may be 9'6" or 4'3" in some example embodiments). Such containers may be loaded and sealed intact onto container ships, railroad cars, cargo planes and truck container chassis and may be easily transferred from one form of transportation to another. In the case of container ships, cargo planes and to some extent railroad cars, the containers may be stacked several containers high. Thus, the use of containers in shipping has resulted in increased handling efficiency, with a corresponding cost reduction.

Containers are typically shipped along the ground on container chassis, which are typically semi-trailers towed behind a truck cab and designed to carry at least one shipping container. The container chassis generally consists of a frame comprising a pair of longitudinal I-beams that extend the length of the chassis but are inset by a distance, typically 30" from the width of the chassis wheelbase. The I-beams are typically separated by transverse cross-members, which in some example embodiments may be 41¾" wide. When in position, the container is centered on the frame such that its sides project substantially beyond the I-beams on either side so that they extend substantially over the wheels. In some example embodiments, this amounts to an outwardly lateral extension of substantially 30 inches. The container may be loaded directly onto and off of the container chassis from another form of transport, such as a container ship, cargo plane or railway car by crane. When being so loaded onto or off of the chassis, the container may, especially if suspended from only a small number of points or not evenly weight distributed or both, list to one side or the other. The overlap of the sides of the container beyond the lateral extent of the frame accommodates this possibility so that damage to the chassis, the container or its contents is minimized.

It is generally known that turbulence created by airflow between the wheels of a towed semi-trailer may significantly reduce fuel efficiency and increase costs of cargo transportation. In non-container chassis semi-trailers, such turbulence may be reduced by installing side skirts or fairings on the semi-trailers in line with the wheels on each side of the semi-trailer and substantially from the frame to a ground surface, in order to improve the aerodynamic profile of the semi-trailer. Such side skirts may provide fuel savings approaching 6.5% and are generally installed by bolting substantially vertically descending lightweight brackets to the underside of the cross-members of the trailer platform to which the side skirts may be affixed. The brackets and the side skirts may be composed of plastic or other lightweight but resilient material.

Heretofore, such side skirts and the concomitant fuel savings have not been available for container chassis because rather than having a trailer platform that extends substantially the entire width of the chassis' wheelbase, the chassis is typically limited to a pair of I-beams substantially inset from the width of the wheelbase, in some example embodiments, by 30 inches. Because the cross-members of the frame do not extend laterally out to the sides of the container positioned on the frame, there is nothing on the frame in line with the wheels on one side of the trailer that could support downwardly-extending side skirts. Conceivably brackets supporting such side skirts could be bolted to the underside of the container, but this is generally not feasible because they would interfere with the loading of the container onto other transportation platforms, such as container ship, railroad, cargo plane or even wheeled container chassis (where the container may be positioned on top or below another container) and would result in significant wasted space. Nor would it be feasible to mount the brackets to the bottom of the container once loaded onto the chassis and to dismount the brackets prior to unloading, as this would entail significant delays and additional handling procedures and obviate many of the benefits of intermodal freight transport.

There has been at least one attempt to provide sideways-extending brackets from which the skirt brackets may descend, but such attempt was discarded because of a tendency for the brackets to be sheared off when a listing container encountered them, for example during loading and unloading operations.

Indeed, while mandating that all freight trailers be fitted with side skirts, the State of California has exempted container chassis, in recognition that this has been considered impossible to implement.

BRIEF DESCRIPTION OF THE DRAWINGS

Like reference numerals are used in the drawings to denote like elements and features.

DESCRIPTION

The present disclosure provides an example embodiment of a mounting assembly for securing a bracket, to which a side skirt may be attached to a frame of a wheeled container chassis semi-trailer. The assembly includes a support and at least one resilient securement member. A proximal end of the support may be mounted in a substantially outwardly transverse horizontal orientation to one side of the semi-trailer. A distal end of the support secures the bracket in a position to maintain the side skirt in a substantially vertical configuration between the frame and a ground surface on which the semi-trailer is situated and substantially in line with the wheels on the one side of the semi-trailer.

The securement members mount the support to the frame whereby the support may move relative to the frame in response to an applied force and is biased to return and maintain the support in the substantially outwardly transverse horizontal orientation when the force is removed.

A system for securing a plurality of brackets, to which at least one side skirt may be attached, to a frame of a wheeled container chassis semi-trailer comprises a plurality of supports and at least one resilient securement member for attaching each support to a frame member. The supports may be attached to the frame member in a substantially outwardly transverse horizontal orientation at a proximal end and a bracket may be secured to a distal end of each support.

At least one securement member may be used to attach each support to the frame member. The supports may move relative to the frame in response to an applied force and are biased to return and maintain the supports in a substantially outward horizontal orientation when the force is removed.

The plurality of supports may be positioned in spaced-apart configuration on at least one side of the frame to support at least one skirt in a substantially vertical configuration between the frame and ground surface on which the semi-trailer is situated and substantially in line with the wheels of the one side of the semi-trailer.

A kit may comprise at least two mounting assemblies, at least two brackets and at least one side skirt.

Figure 1:
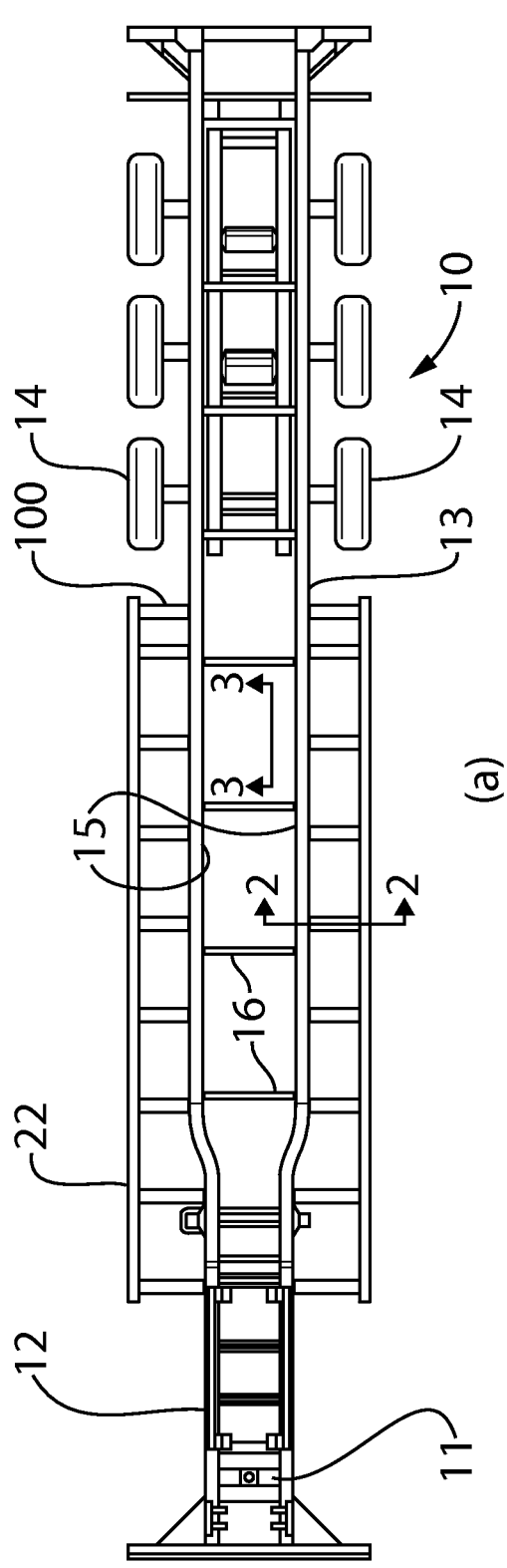
FIG. 1(a) is a plan view of a container chassis semi-trailer incorporating a plurality of side skirt mounting assemblies according to an example embodiment of the present disclosure mounted thereon.
FIG. 1(b) is a left side view of the container chassis semi-trailer according to the example embodiment of FIG. 1(a)
Figure 1:
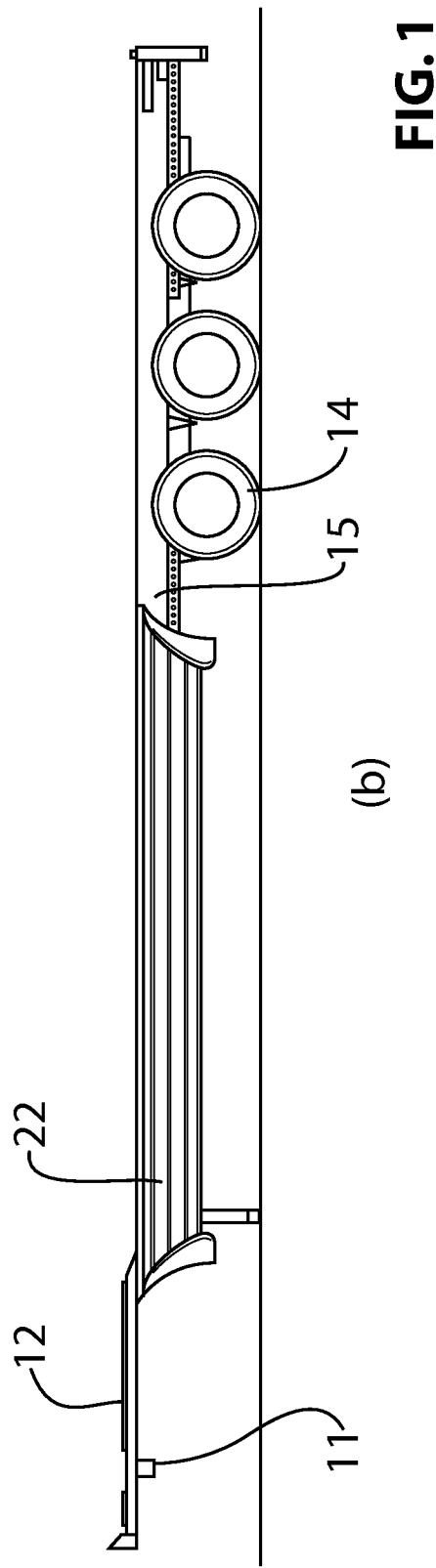

Turning now to FIG. 1(a), it may be seen that a container chassis semi-trailer, shown generally at 10, comprises a hitch system 11 for attachment to a truck cab (not shown), an extended neck 12 and a longitudinal frame 13 secured thereto and extending substantially the remaining length of the semi-trailer 10. A plurality of wheels 14 are mounted to and below the frame 10, typically in pairs, in some example embodiments, toward the rear of the frame 10. In some example embodiments, the frame 10 comprises a pair of longitudinal I-beams 15 separated by a plurality of transverse cross-members 16.

A container (not shown) may then be lowered, for example, by a crane (not shown), onto the frame 13. In some example embodiments, the sides of the container protrude beyond the I-beams 15. In some example embodiments, the sides of the container are substantially in line with the wheels 14 on each side of the semi-trailer 10. In some example embodiments, the container will not overlie the neck 12, in order to provide a capability to turn the semi-trailer 10 without interference from the container.

A number of side skirt mounting assemblies, shown generally at 100, according to the present disclosure are mounted substantially outwardly transverse from a central vertical web 20 (as may be better seen in FIG. 2) of each I-beam 15 of the frame 14 in spaced-apart fashion. In some example embodiments, the mounting assemblies 100 are mounted 37½" apart on centre. In some example embodiments, the mounting assemblies 100 are mounted in an identical pattern along both I-beams 15 of the frame 14.

The number and spacing of the mounting assemblies 100 on each I-beam 15 of the frame 14 may be varied to accommodate semi-trailers 10 and containers of different configuration. Load capacity and other considerations may dictate the number and spacing of the mounting assemblies 100 to be employed.

In some example embodiments, additional mounting assemblies 100 may be mounted behind the wheels in addition to or in substitution for the assemblies 100.

Figure 2:
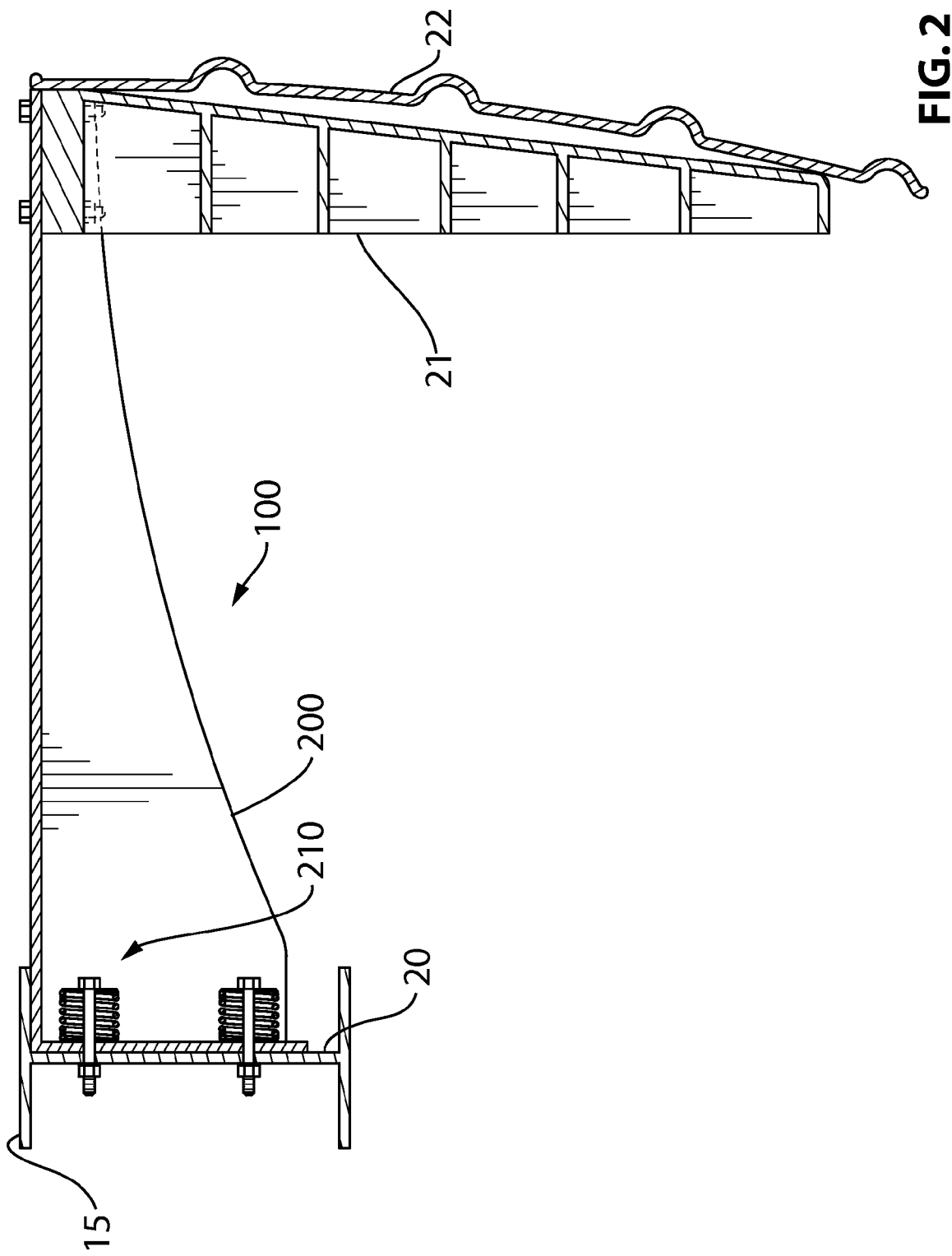
FIG. 2 is a rear cross-sectional view taken along section 2-2 of FIG. 1(a), of one of the mounted side skirt mounting assemblies according to the example embodiment of FIG. 1(a)

As may be better seen in FIG. 2, which shows a rear cross-sectional view taken along section 2-2 of FIG. 1(a), of one of the mounted assemblies 100 according to the example embodiment of FIG. 1(a), each of the mounting assemblies 100 supports, at a distal end, a substantially vertically downwardly-extending bracket 21, to which a side skirt 22 may be secured. The side skirt 22 extends laterally along a portion or substantially the entirety of the length of the semi-trailer 10 in front of or between (or both) and substantially in line with the wheels 14 on each side of the semi-trailer 10. In some example embodiments, the side skirts 22 are discontinuous where the wheels 14 are located. This may be seen in FIG. 1(b), which is a left side view of the semi-trailer 10 with mounted side skirts 22 according to the example embodiment of FIG. 1(a).

Figure 3:
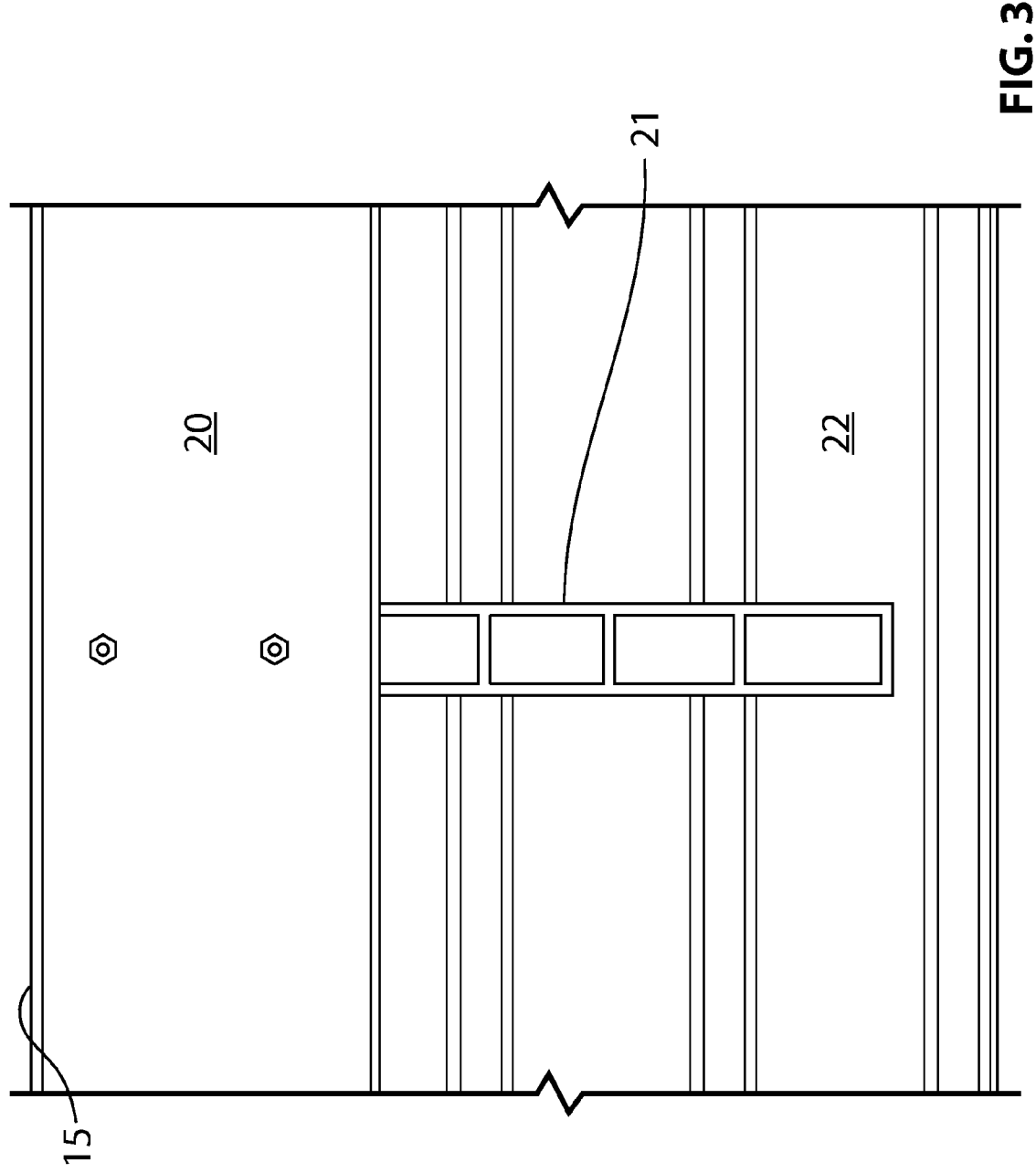
FIG. 3 is an interior cross-sectional view taken along section 3-3 of FIG. 1(a), of one of the mounted side skirt mounting assemblies according to the example embodiment of FIG. 1(a)

FIG. 3 is a cross-sectional view taken along section 3-3 of FIG. 1(a), from inside the I-beam 15 on one side of the trailer 10, showing the bracket 21 and the side skirt 22 being supported from the I-beam 15.

Figure 4:
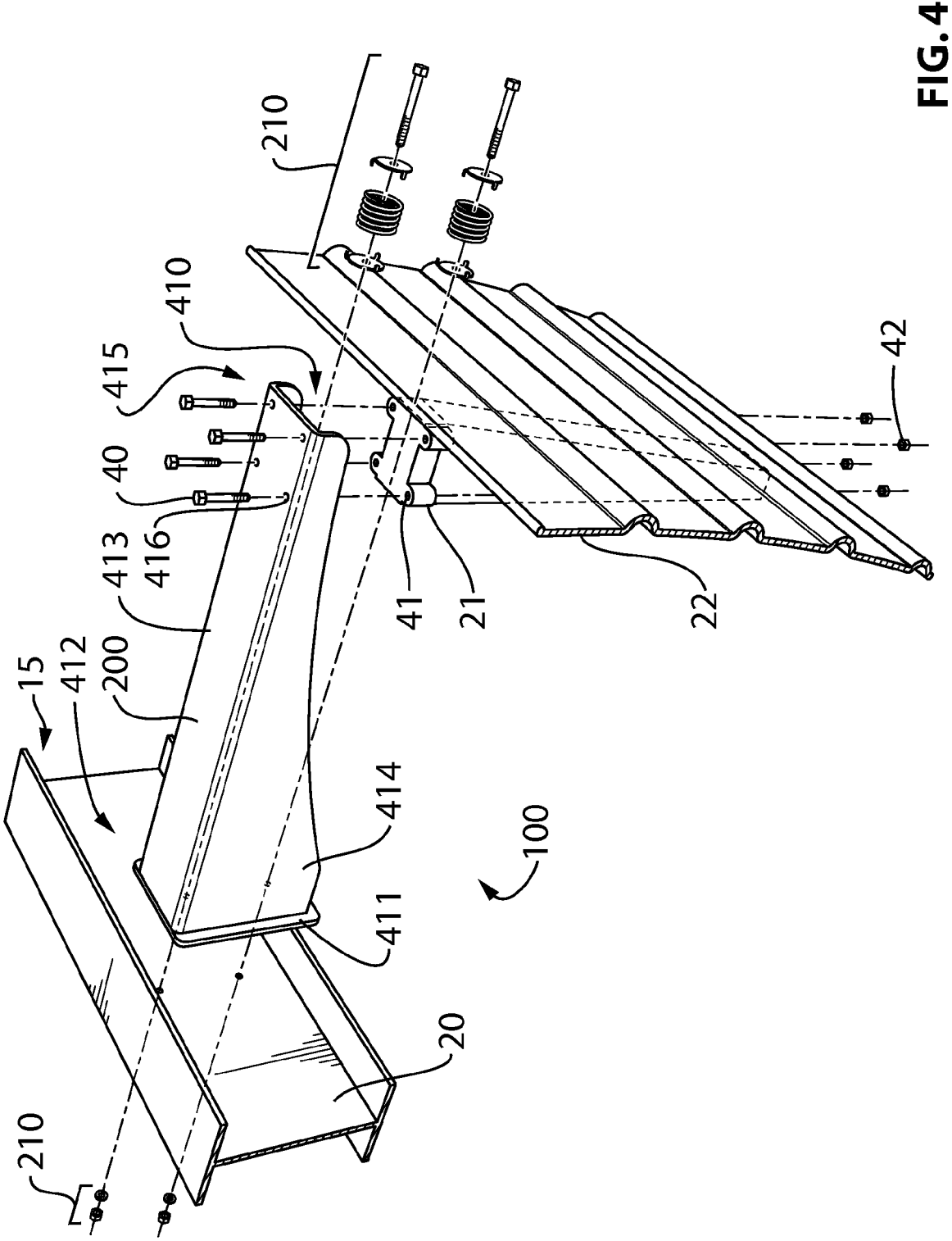
FIG. 4 is an exploded perspective view of an example embodiment of the side skirt mounting assembly according to the example embodiment of FIG. 1(a)

As may be better seen in FIG. 4, which is an exploded perspective view of an example embodiment of the mounting assembly 100 according to the example embodiment of FIG. 1(a), each mounting assembly 100 comprises a support 200 and at least one resilient securement member (shown generally in exploded form at 210) by which the support 200 may be mounted in a substantially outwardly transverse horizontal orientation to a central vertical web 20 of one of the I-beams 15 of the frame 13.

In some example embodiments, the support 200 comprises a downwardly formed longitudinal channel 410 with a transverse attachment plate 411 attached to a proximal end 412 of the channel 410. The formed channel 410 is generally U-shaped with a horizontal web 413 terminating at two downwardly extending legs 414. In some example embodiments, each of the downwardly extending legs 414 taper from a maximum thickness at the proximal end 412 relative to the attachment plate 411 to a minimum thickness at a distal end 415 relative to the attachment plate 411. In some example embodiments, the downwardly extending legs 414 taper linearly from the maximum thickness to the minimum thickness. In some example embodiments, the channel 410 is formed of a single plate sheet with rounded corners where the horizontal web 413 intersects with the downwardly extending legs 414. In some example embodiments, the channel 414 is formed of aluminum.

The horizontal web 413 has a length such that when substantially outwardly transversely mounted to the central vertical web 20 of the I-beam 15, the bracket 21 and side skirt 22 do not substantially protrude beyond but remain substantially in line with the wheels 14 of that side of the semi-trailer 10. Thus, the overall width of the semi-trailer 10, including both side skirts 22, does not exceed prevailing regulatory limits. In some example embodiments, such overall width may not exceed 8 feet or 2.6 m.

The attachment plate 411 is a planar sheet having a plurality of bores passing through it in a pattern to match a plurality of bores in the central vertical web 20 of one of the I-beams 15 of the frame 13. In some example embodiments, two resilient securement members 210 are employed for each mounting assembly 100. In some example embodiments, the securement members 210 are mounted in a common horizontal plane.

The U-shaped configuration of the channel 410, coupled with the tapered profile of the descending legs 414, provides access to join the channel 410 to the central vertical web 20 of the I-beam 15 by the securement members 210.

The attachment plate 411 may be vertically secured against the proximal end 412 of the channel 410, for example by welding. In some example embodiments, the attachment plate 411 is composed of aluminum.

The bracket 21 is secured to and supported by the distal end 415 of the support 200, such that the bracket 21 extends in a substantially vertically downward orientation. In some example embodiments, the bracket 21 is suspended from the channel 410 by fasteners such as bolts 40 passing through bores 416 in the horizontal web 413 of the channel 410 and bores 41 in the bracket 21 and secured by nuts 42.

Figure 5:
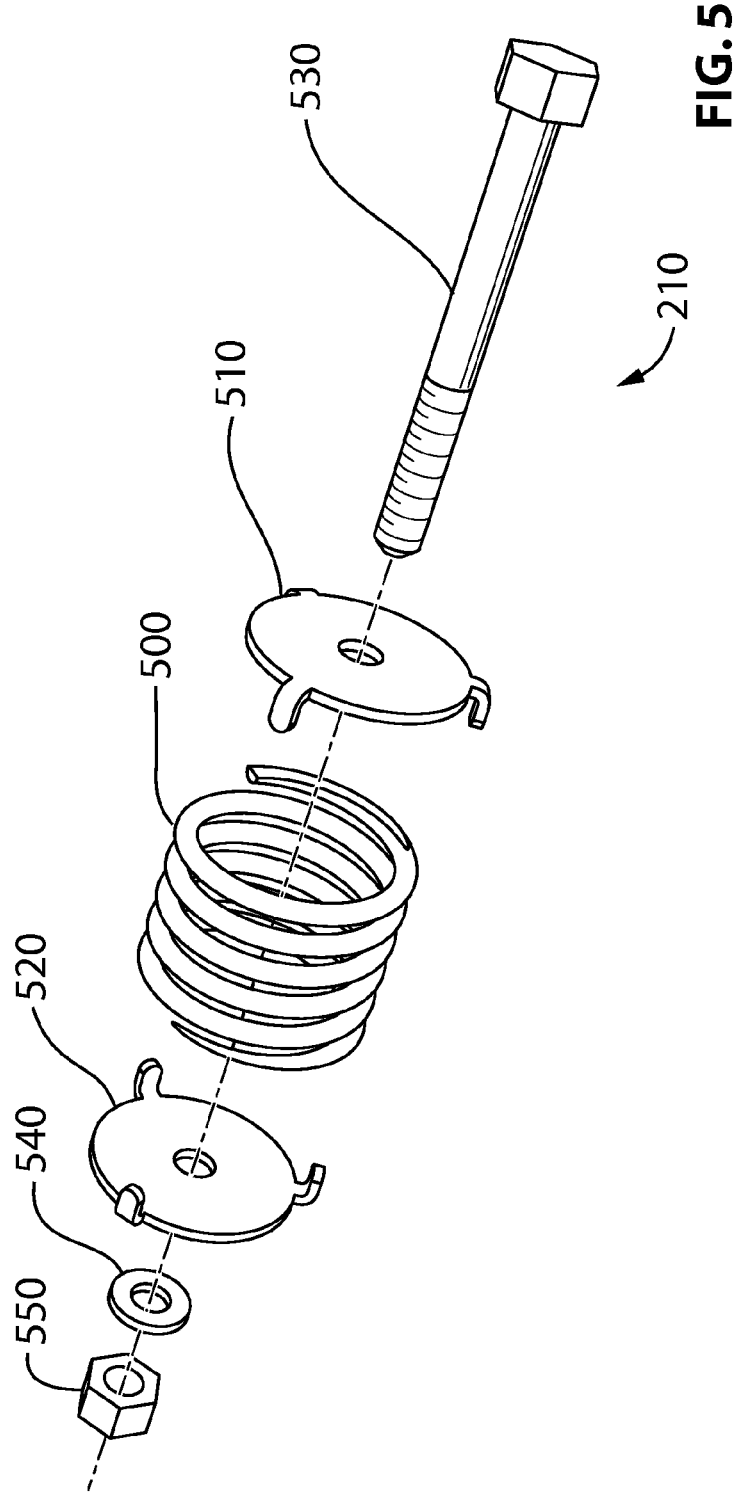
FIG. 5 is an exploded perspective view of an example embodiment of a spring assembly for use in the side skirt mounting assembly according to the example embodiment of FIG. 1(a)
Figure 6:
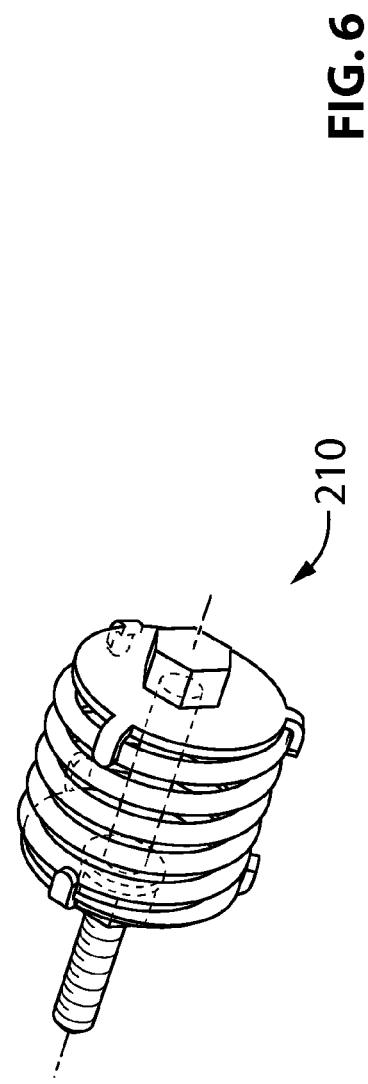
FIG. 6 is a perspective view of the spring assembly according to the example embodiment of FIG. 5 in assembled form.

As shown in FIGS. 5 and 6, in some example embodiments, such securement members 210 may comprise spring assemblies that comprise a compression spring 500, surrounded by a pair of spring retainers 510, 520 and secured in place by an elongate bolt 530, a washer 540 and a nut 550.

The compression spring 500 is sized to fit over the bolt 530 and be contained between the spring retainers 510, 520. In some example embodiments, the spring constant of the compression spring 500 is sufficient to both maintain the horizontal web 413 of the channel 410 substantially horizontally level when mounted to the central vertical web 20 of the I-beam15 of the frame 13 with the securement members 210 when not under load but provide sufficient resiliency to permit the channel 410 to move in any direction upon impact, for example, by a listing container (not shown) when being loaded or unloaded from the semi-trailer 10, without breaking off from the frame 13.

In some example embodiments, the bolt 530, washer 540 and nut 550 are composed of zinc-plated steel. In some example embodiments, the bolt 530 is ⅜"-16 grade 8 bolt, the washer is a ⅜" washer 540 and the nut 550 is a ⅜"-16 hex nut. Thus, the components employed to make up the securement members 210 are generally readily available.

The bolt 530, with the two spring retainers 510, 520 surrounding the compression spring 500 and mounted on the bolt 530, is positioned against the attachment plate 411 and the bolt 530 is passed through the bores in both the attachment plate 411 and the central vertical web 20 of the I-beam 15. The bolt 530 is secured by the washer 540 and the nut 550 on the other side of the central vertical web 20 of the I-beam 15.

As shown in FIG. 2, in some example embodiments, the side skirt 22 may have a side profile suitable for maximizing the aerodynamic configuration of the semi-trailer 10. In some example embodiments, such profile may conform to or be complementary to a side profile of the brackets 21.

The profile of the side skirt 22 may, in some example embodiments, be straight or concavely or convexly curved. In some example embodiments, the side skirt 22 profile may comprise at least one rounded or jagged protrusion extending therealong. In some example embodiments, the side skirt 22 profile may remain constant along the length of the side skirt 22 or may vary substantially continuously or abruptly along the length of the side skirt 22.

In some example embodiments, the side skirt 22 may comprise one or more strips which extend longitudinally the length of the side skirt 22. In some example embodiments, adjacent strips may be separated by a small distance or may abut one another. The strips may lie in a common substantially vertical plane or may be staggered outwardly or inwardly outward.

The side skirt 22 and the supporting brackets 21 may be provided by a manufacturer of trailer fairings, such as Laydon Composites Ltd. of Oakville, Ontario, Canada and in some example embodiments may be substantially identical to those side skirts 22 and brackets 21 designed for and installed on non-container chassis semi-trailers. The side skirts 22 are affixed to the brackets 21 in the standard fashion. Thus in this fashion, only the supports 200 are constructed specifically for use with container chassis semi-trailers 10.

In some example embodiments, as shown in FIGS. 2 and 3, the bracket 21 may be in open cellular form, to provide a minimum amount of stability to support the side skirt 22 while minimizing weight. In some example embodiments, the bracket 21 itself will bend upon impact and spring back to the original form without any damage when the impact force is removed. In some example embodiments, the bracket 21 may be composed of glass fiber-reinforced nylon or similar material.

The various embodiments presented herein are merely examples and are in no way meant to limit the scope of this disclosure. Variations of the innovations described herein will become apparent from consideration of this disclosure and such variations are within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combination will become readily apparent upon review of the present disclosure as a whole. The subject matter described herein and in the recited claims intends to cover and embrace all suitable changes in the technology.

According to an embodiment of the present disclosure there is provided a mounting assembly for securing a bracket, to which a side skirt may be attached to a frame of a wheeled container chassis semi-trailer, the mounting assembly comprising: a support for attachment, in a substantially outwardly transverse horizontal orientation at a proximal end to a frame member, of the bracket to one side of the frame, a distal end of the support for securing the bracket in a position to maintain the side skirt in a substantially vertical configuration between the frame and a ground surface on which the semi-trailer is situated and substantially in line with the wheels of one side of the semi-trailer; and at least one resilient securement member for attaching the support to the frame member, whereby the support may move relative to the frame in response to an applied force and is biased to return and maintain the support in a substantially outwardly transverse horizontal orientation when the force is removed.

According to another embodiment of the present disclosure there is provided a system for securing a plurality of brackets, to which at least one side skirt may be attached, to a frame of a wheeled container chassis semi-trailer, comprising: a plurality of supports for attachment in a substantially outwardly transverse horizontal orientation at a proximal end to a frame member, a distal end of each support for securing the bracket; and at least one resilient securement member for attaching each support to the frame member, whereby the supports may move relative to the frame in response to an applied force and are biased to return and maintain the supports in a substantially outward horizontal orientation when the force is removed; and the plurality of supports positioned in spaced-apart configuration on at least one side of the frame to support at least one side skirt in a substantially vertical configuration between the frame and ground surface on which the semi-trailer is situated and substantially in line with the wheels of the one side of the semi-trailer.

According to another embodiment of the present disclosure there is provided a kit comprising at least two mounting assemblies as described in the present disclosure, at least two brackets and at least one side skirt Accordingly the specification and the embodiments disclosed therein are to be considered examples only, with a true scope and spirit of the disclosure being disclosed by the following numbered claims:

What is claimed is:

1. A mounting assembly for securing a bracket, to which a side skirt may be attached to a frame of a wheeled container chassis semi-trailer, the mounting assembly comprising:
a support for attachment, in a substantially outwardly transverse horizontal orientation at a proximal end to a frame member, of the bracket to one side of the frame, a distal end of the support for securing the bracket in a position to maintain the side skirt in a substantially vertical configuration between the frame and a ground surface on which the semi-trailer is situated and substantially in line with the wheels of one side of the semi-trailer; and
at least one resilient securement member for attaching the support to the frame member, whereby the support may move relative to the frame in response to an applied force and is biased to return and maintain the support in the substantially outwardly transverse horizontal orientation when the force is removed; and
wherein the support comprises a downward facing U-shaped channel and an attachment plate configured to be mounted to the frame member.

2. The mounting assembly according to claim 1, wherein the channel comprises a horizontal web and a pair of downwardly extending legs.

3. The mounting assembly according to claim 2, wherein the horizontal web comprises at least one bore at its distal end for securing the bracket thereto.

4. The mounting assembly according to claim 2, wherein the horizontal web and the legs are formed from a common sheet of material.

5. The mounting assembly according to claim 1, wherein the attachment plate is secured to the proximal end of the channel.

6. The mounting assembly according to claim 1, wherein the attachment plate comprises at least one bore to accommodate the securement member.

7. The mounting assembly according to claim 1, wherein the support is composed of aluminium.

8. The mounting assembly according to claim 1, wherein the securement member comprises a bolt, a nut, a resilient member and a pair of retainers for securing the resilient member therebetween and on the bolt.

9. The mounting assembly according to claim 8, wherein the bolt with retainers and resilient member positioned thereon is passed through the support and the frame member and secured thereto by the nut.

10. The mounting assembly according to claim 1, wherein the at least one resilient securement member comprises two resilient securement members.

11. The mounting assembly according to claim 1, wherein the at least one securement member is positioned in a substantially horizontal configuration.

12. A system for securing a plurality of brackets, to which at least one side skirt may be attached, to a frame of a wheeled container chassis semi-trailer, comprising:
a plurality of supports for attachment in a substantially outwardly transverse horizontal orientation at a proximal end to a frame member, a distal end of each support for securing one of the plurality of brackets, each support comprising a downward facing U-shaped channel and an attachment plate configured to be mounted to the frame member; and
at least one resilient securement member for attaching each support to the frame member, whereby the supports may move relative to the frame in response to an applied force and are biased to return and maintain the supports in a substantially outward horizontal orientation when the force is removed; and
the plurality of supports positioned in spaced-apart configuration on at least one side of the frame to support the brackets in a position to maintain at least one side skirt in a substantially vertical configuration between the frame and a ground surface on which the semi-trailer is situated and substantially in line with the wheels of the one side of the semi-trailer.

13. The system according to claim 12, comprising a plurality of supports positioned on each side of the frame.

14. The system according to claim 13, wherein the plurality of supports on each side of the frame are in complementary positions.

15. A kit comprising at least two mounting assemblies according to claim 1, at least two brackets and at least one side skirt.

* * * * *